United States Patent [19]

Buter

[11] 4,245,074
[45] Jan. 13, 1981

[54] METHOD FOR THE PREPARATION OF AN ACRYLATE COPOLYMER AND LIQUID COATING COMPOSITION HAVING A HIGH SOLIDS CONTENT BASED ON AN ACRYLATE COPOLYMER THUS PREPARED

[75] Inventor: Roelof Buter, Dieren, Netherlands

[73] Assignee: Akzo N.V., Arhem, Netherlands

[21] Appl. No.: 926,616

[22] Filed: Jul. 21, 1978

[30] Foreign Application Priority Data

Jul. 23, 1977 [NL] Netherlands ............... 7708218

[51] Int. Cl.$^3$ ............................. C08F 2/00; C08F 2/38
[52] U.S. Cl. .................................... 526/214; 526/317; 560/112
[58] Field of Search ............... 526/214, 317; 560/112

[56] References Cited

U.S. PATENT DOCUMENTS

| | | | |
|---|---|---|---|
| 2,878,237 | 3/1959 | Russell et al. | 526/214 |
| 3,113,114 | 12/1963 | Maginn et al. | 526/214 |
| 3,218,302 | 11/1965 | Melamed | 526/214 |
| 4,082,818 | 4/1978 | Coffey et al. | 526/214 |

FOREIGN PATENT DOCUMENTS 1009214 11/1965 United Kingdom .

*Primary Examiner*—William F. Hamrock
*Attorney, Agent, or Firm*—Stevens, Davis, Miller & Mosher

[57] ABSTRACT

A method is provided for the preparation of an acrylate copolymer having a number average molecular weight of 400-2000 by polymerization of a monomer mixture consisting of 35-60 mole % of styrene and/or α-methyl styrene, 20-60 mole % of acrylic acid and/or methacrylic acid and 0-30 mole % of one or more other monovinyl compounds in the presence of a 2 to 8 carbon atoms-containing mercaptomonocarboxylic acid or mercaptodicarboxylic acid as chain length regulator in an amount of 0.05 to 0.2 moles per mole of the monomeric compounds, after which the resulting reaction product is brought into reaction with a glycidyl ester of a monocarboxylic acid. The invention also relates to a liquid coating composition having a solids content of at least 60% by weight based on the acrylate copolymer thus prepared and a curing agent.

5 Claims, No Drawings

METHOD FOR THE PREPARATION OF AN ACRYLATE COPOLYMER AND LIQUID COATING COMPOSITION HAVING A HIGH SOLIDS CONTENT BASED ON AN ACRYLATE COPOLYMER THUS PREPARED

This invention relates to a method for the preparation of an acrylate copolymer by polymerization of a monomer mixture consisting of 35–60 mole % of styrene and/or α-methyl styrene, 20–60 mole % of acrylic acid and/or methacrylic acid and 0–30 mole % of one or more other monovinyl compounds at a temperature of 60° to 200° C. in the presence of a radical initiator, after which the resulting reaction product is brought into reaction with a glycidyl ester of a carboxylic acid of the general formula

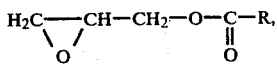

where R represents an alkyl group having 4 to 10 carbon atoms.

A compound of the type indicated above is known from British Patent Specification No. 1,009,217, in which however exclusively high molecular weight acrylate copolymers are described. It is of course possible to make use of chain length regulating compounds such as dodecyl mercaptan, but they have the disadvantage that the resulting products give out a strong smell.

An object of the invention is to provide a method for the preparation of low molecular weight acrylate copolymers which do not at all or hardly give out any smell and are excellently suitable for use in liquid coating compositions having a high solids content.

The method provided by the invention is characterized in that the polymerization of the monomeric compounds is carried out in the presence of a 2 to 8 carbon atoms-containing mercaptomonocarboxylic acid as chain length regulator in an amount of 0.02 to 0.25 moles per mole of the monomeric compounds.

As representative examples of chain length regulators may be mentioned mercaptoacetic acid, 2-mercaptopropionic acid, 3-mercaptopropionic acid, mercaptovaleric acid, 2-mercaptobenzoic acid, mercaptosuccinic acid, mercaptoisophthalic acid. Preferably use should be made of a mercaptomonocarboxylic acid and/or a mercaptodicarboxylic acid containing 2 to 6 carbon atoms, more particularly a mercaptopropionic acid. The chain length regulator is preferably used in an amount of 0.05 to 0.20 moles per mole of the monomeric compounds.

As mentioned before, the monomer mixture to be polymerized may be built up from 35–60 mole % of styrene and/or α-methyl styrene and 20–60 mole % of acrylic acid and/or methacrylic acid as well as from not more that 30 mole % of one or more other monovinyl compounds, for instance: acrylonitrile, vinyl chloride and vinyl acetate. Such a monovinyl compound, however, should preferably be a monoacrylic or a monomethacrylic ester of an alcohol having 1–12 carbon atoms and 1–3 hydroxyl groups. As examples of such compounds, hereinafter referred to as acrylate monomer, may be mentioned methyl acrylate, methyl methacrylate, ethyl acrylate, hydroxyethyl acrylate, hydroxyethyl methacrylate, hydroxypropyl acrylate, hydroxypropyl methacrylate, butyl acrylate, hydroxybutyl acrylate, 2-ethylhexyl acrylate, hydroxyoctyl acrylate, dodecyl methacrylate, trimethylol propane monoacrylate, 2-hydroxy-3-chloropropyl acrylate. Alternatively, mixtures of 2 or more acrylate comonomers may be used.

In the polymerization of the monomer mixture as a rule use is made of an organic solvent in an amount of 10–40 parts by weight per 100 parts by weight of the monomeric compounds if the acrylate copolymer to be prepared is also made up of styrene; if use is made of α-methyl styrene, then generally no use will be made of a solvent. Examples of suitable organic solvents include esters, such as ethyl acetate, butyl acetate and ethyl glycol acetate; ketones such as methyl ethyl ketone and methyl isobutyl ketone and hydrocarbons such as petroleum ether, toluene and xylene. As examples of suitable radical initiators may be mentioned dibenzoyl peroxide, dicumyl peroxide, methylethyl ketone peroxide, cumene hydroperoxide, tert. butyloxy-2-ethyl hexanoate, tert.butyl perbenzoate, tert. butylcumyl peroxide, di-tert. butylperoxy-3, 3,5-trimethyl cyclohexane, 1,3-bis(-tert.butyl)peroxyisopropyl benzene and azobisisobutyronitrile. It is also possible to use mixtures of the above-envisaged radical initiators. The radical initiator is generally used in an amount of 0.05–5% by weight, and preferably of 0.1–3% by weight, based on the total amount of monomer.

According to the method of the invention the reaction product obtained by polymerization of the monomer mixture is subsequently brought into reaction with a glycidyl ester of a carboxylic acid of the general formula

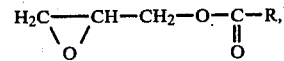

where R represents an alkyl group having 4 to 10 carbon atoms. It is preferred that in the general formula for the glycidyl ester R should be a branched alkyl group having 4 carbon atoms or 8–10 carbon atoms. Examples of suitable carboxylic acids of which the glycidyl ester according to the invention may be used include 1,1-dimethyl-1-ethane carboxylic acid, 1,1-dimethyl-1-propane carboxylic acid, 1-methyl-1-ethyl-1-propane carboxylic acid, 1-pentane carboxylic acid, 3-methyl-1-butane carboxylic acid, 1-hexane carboxylic acid, 1-heptane carboxylic acid, 1,1-dimethyl-1-hexane carboxylic acid, 1-octane carboxylic acid, decanoic acids such as 1,1-dimethyl-1-heptane carboxylic acid, nonane carboxylic acid and isononane carboxylic acid and 1,1-dimethyl-1-octane carboxylic acid. It is preferred that use should be made of the glycidyl ester of pivalic acid or the one of 1,1-dimethylheptane-1-carboxylic acid.

The reaction with the glycidyl ester usually takes place "en masse" or in the presence of an organic solvent at a temperature between 60° and 100° C. For the reaction between the carboxyl group and the epoxy group use is made generally of a suitable catalyst, for instance an acid catalyst, such as p-toluene sulphonic acid and sulphuric acid, or a basic compound, such as ammonia and an amine, and ammonium and phosphonium compounds, for instance tetramethyl ammonium chloride, benzyltrimethyl ammonium methoxide and triphenylbenzyl phosphonium chloride, and compounds such as zinc chloride and zinc acetyl acetonate.

The constructive reation with the glycidyl ester has the advantage that traces of the mercapto compound used in the preceding reaction can be rendered innocuous in an effective manner, so that an odourless product is obtained.

According to the invention the acrylate copolymer has a number average molecular weight in the range of 400 to 2000, and preferably in the range of 600 to 1500. This means that on an average 2–10 monomer units are present in 1 molecule of the acrylate copolymer.

The acrylate copolymer described hereinbefore may conceivably be built up from 35–60 mole % of styrene and/or α-methyl styrene, and from 20–60 mole % of a compound having the general formula

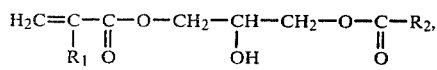

wherein $R_1$ is a hydrogen atom or a methyl group and $R_2$ represents an alkyl group containing 4–10 carbon atoms, and from 0–30 mole % of one or more other monovinyl compounds, and the number average molecular weight of the acrylate copolymer is in the range of 400 to 2000. It is preferred that in the general formula $R_1$ should represent a hydrogen atom and $R_2$ a branched alkyl group having 4 or 8–10 carbon atoms.

The invention also relates to a liquid coating composition having a solids content of at least 60% by weight and preferably at least 70% by weight, based on the above-described acrylate copolymer and a curing agent for the acrylate copolymer. The solids content is determined in accordance with ASTM method D 1644-59 after heating for 1 hour at 105° C.

As curing agent for the acrylate copolymer in the coating composition according to the invention there is generally used an N-methylol groups and/or N-methylol ether groups-containing aminoplast which is obtained by reaction of an aldehyde, for instance formaldehyde with an amino groups- or amido groups-containing compound such as melamine, urea, N,N'-ethylene urea, dicyandiamide and benzoguanamine; for the preparation of these compounds see, for instance, Houben-Weyl, Methoden der organischen Chemie, Volume 14/2, p. 319–371 (1963). It is preferred that the above-described compounds should entirely or partly be etherified with alcohols having 1 to 6 carbon atoms, for instance methanol, ethanol, n-propanol, isopropanol, n-butanol, isobutanol, amyl alcohol, hexanol or mixtures of the above-envisaged alcohols. Use is made particularly of a methylol melamine having 4 to 6 methylol groups per molecule of melamine, at least 3 methylol groups being etherified with methanol, ethanol, propanol or butanol, and preferably with methanol, or a condensation product of formaldehyde and N,N'-ethylene diurea etherified with butanol. Use is made more particularly of a hexalkoxymethyl melamine, with the alkoxy group containing 1 to 4 carbon atoms. Instead of or besides the above-described curing agents other suitable agents may be employed, for instance blocked or nonblocked polyisocyanates.

The curing agent is generally used in such an amount that the molar ratio of the hydroxyl groups present in the coating composition to the reactive groups of the curing agent is in the range of approximately 0.7 to 1.5, and preferably in the range of 0.8 to 1.3.

The coating composition may further contain usual adjuvants and additives, for instance pigment dispersing agents, anti-sagging agents or other means of influencing the rheological properties, pigments, dyes, and accelerators for the curing reation, for instance acid compounds such as p-toluene sulphonic acid or blocked products thereof. The coating composition may further contain one or more organic solvents, such as esters, for instance ethyl acetate, butyl acetate and ethylglycol acetate; ketones, for instance methylethyl ketone and methylisobutyl ketone; and hydrocarbons, for instance petroleum ether, toluene and xylene. The organic solvent is present in the ready-for-use coating composition in an amount of 10–40 parts by weight per 100 parts by weight of the composition. When use is made of acrylate copolymer having a high acid number, for instance of about 30 or higher, water may be used as a solvent if carboxyl groups of the copolymer are neutralized with a basic compound, such as an alkali metal or ammonium hydroxide or an amine. The ready-for-use coating composition generally has a viscosity not higher that 20 poises, and preferably from 0.5 to 10 poises.

The coating composition may be applied to the substrate in any convenient manner, for instance by roller coating, spraying, brushing, sprinkling, flow coating, dipping or electrostatic spraying.

The coating composition may further be cured or baked in the usual manner, for instance at ambient temperature or at the usual temperatures of, for instance, between 100° and 160° C., while being kept in a baking oven for 20 to 60 minutes.

Upon being cured the coating composition according to the invention will form a coating having a high gloss and excellent durability. It particularly has generally a remarkably high resistance to, for instance, $SO_2$ (Kesternich test) and organic solvents and ultraviolet light (Weather-O-meter test). Especially the resistance to $SO_2$ is surprising, considering the usually poor resistance to it of high molecular polyacrylates. In the following examples, which do not limit the scope of the present invention, the Persoz hardness was measured and the values obtained expressed in seconds. An acceptable minimum value for the hardness is about 200 seconds. The flexibility was determined with a "falling-weight" coating tester (Erichsen type 304) in accordance with ASTM D 2794-69, using a weight of 0.908 kg, measuring 15.9 mm in diameter and having a dropping opening of 16.3 mm, the value obtained being expressed in kg.cm. In conformity with this method, the values were determined both for the coated side and the back of the test panel (Bonder 120). An acceptable minimum for the flexibility is about 10 kg.cm. The gloss was determined at angles of 60° and 20° (ASTM D-523). A gloss value at 60° of over 90 is high. A gloss value at 20° of over 80 is also to be considered high. The values for the measured properties are given in Table 1. Furthermore, of the coatings obtained there were determined the resistance to xylene, to sulphur dioxide in the Kesternich test in accordance with DIN 50.018 (with 2 l $SO_2$ for 3 cycles) and the gloss at 60° after 680 hours exposure in the Weather-O-meter in conformity with ASTM D 822-60 (using a Sunshine carbon arc with Cornex-D filters in a 17/3-cycle). These values are listed in Table 2.

The spraying compositions described in the examples all had a viscosity at 20° C. of 24 seconds (Ford cup No. 4). The solids content of the coating compositions used in the examples was 69–76 % by weight. In all examples the coating (after baking) had a layer thickness of 40 μm. The pigment dispersion used in the examples was prepared by intermixing 24 parts by weight of titanium dioxide, 1.5 parts by weight of a pigment dispersing agent (a polyacrylate having a high molecular weight), 7.5 parts by weight of hexamethoxymethyl melamine and 3.0 parts by weight of xylene, and grinding the resulting mixture in a Red-Devil shaking machine and subsequently filtering it off.

Preparation of acrylate copolymers

EXAMPLE 1

In a reactor provided with a stirrer, a thermometer, a reflux condenser and a dropping funnel there were intermixed 70.8 grammes (0.6 moles) of α-methyl styrene, 28.8 grammes (0.4 moles) of acrylic acid, 5.3 grammes (0.05 moles) of 3-mercaptopropionic acid and 2.4 grammes of dicumyl peroxide. The mixture was heated in a nitrogen atmosphere to a temperature of 150° C., at which temperature it was kept for 1 hour. Upon conclusion of the reaction 18.9 grammes (0.16 moles) of non-converted α-methyl styrene were removed from the reaction product by distillation in vacuo.

Subsequently, the reaction product obtained was mixed with 0.25 grammes of triphenyl benzyl phosphonium chloride, after which over a period of 1 hour 125 grammes of the glycidyl ester of 1,1-dimethyl-1-heptane carboxylic acid were added at a temperature of 150° C. The acrylate copolymer prepared had an acid number of 0.3 and a number average molecular weight of 1300.

EXAMPLE 2

The same procedure was employed as in Example 1, except that the 3-mercaptopropionic acid was used in an amount of 10.6 grammes (0.1 mole), and in the reaction with the glycidyl ester the catalyst and the glycidyl ester were used in amounts of 0.3 grammes and 138 grammes, respectively. Upon conclusion of the polymerization reaction 11.8 grammes (0.1 mole) of non-converted α-methyl styrene were removed from the reaction product. The acrylate copolymer prepared had an acid number of 0.3 and a number average molecular weight of 1100.

EXAMPLE 3

The same procedure was employed as in Example 1, except that the 3-mercaptopropionic acid was used in an amount of 21.2 grammes (0.2 moles), and in the reaction with the glycidyl ester the catalyst and the glycidyl ester were used in amounts of 0.35 grammes and 163 grammes, respectively. Upon conclusion of the polymerization reaction 10.6 grammes (0.09 moles) of non-converted α-methyl styrene were removed.

The acrylate copolymer prepared had an acid number of 6.0 and a number average molecular weight of 900.

EXAMPLE 4

The same procedure was used as in Example 3, except that in the first reaction step use was made of a polymerization mixture consisting of 47.2 grammes (0.4 moles) of α-methyl styrene, 28.8 grammes (0.4 moles) of acrylic acid, 17.0 grammes (0.16 moles) of 3-mercaptopropionic acid and 2.0 grammes of dicumyl peroxide. Upon conclusion of the polymerization reaction it was found that all of the monomer had been converted.

The acrylate copolymer prepared had an acid number of 3.6 and a number average molecular weight of 850.

EXAMPLE 5

The same procedure was used as in Example 4, except that the 3-mercapto-propionic acid was used in an amount of 8.5 grammes (0.08 moles) and the dicumyl peroxide in an amount of 1.0 gramme, and the phosphonium chloride and the glycidyl ester were used in amounts of 0.3 grammes and 138 grammes, respectively. Upon conclusion of the polymerization reaction it was found that all of the monomer had been converted.

The acrylate copolymer prepared had an acid number lower that 0.1 and a number average molecular weight of 1200.

EXAMPLE 6

The procedure of Example 4 was repeated, with the exception that instead of 28.8 grammes (0.4 moles) of acrylic acid there was used a mixture of 21.6 grammes (0.3 moles) of acrylic acid and 12.8 grammes (0.1 mole) of n-butyl acrylate, and the glycidyl ester was used in an amount of 128 grammes. Upon conclusion of the polymerization reaction it was found that all of the monomer had been converted.

The acrylate copolymer prepared had an acid number of 5.0 and a number average molecular weight of 700.

EXAMPLE 7

The procedure of Example 4 was repeated, but in such a way that instead of 28.8 grammes (0.4 moles) of acrylic acid there was used a mixture of 14.4 grammes (0.2 moles) of acrylic acid and 25.6 grammes (0.2 moles) of butyl acrylate, and the phosphonium chloride and the glycidyl ester were employed in amounts of 0.3 grammes and 100 grammes, respectively. Upon conclusion of the polymerization reaction it was found that all of the monomer had been converted.

The acrylate copolymer formed had an acid number of 3.9 and a number average molecular weight of 750.

EXAMPLE 8

The same procedure was used as in Example 5, with the exception that styrene was used instead of α-methyl styrene in an amount of 41.6 grammes (0.4 moles), the dicumyl peroxide was used in an amount of 2.0 grammes and 55 grammes of xylene were contained in the polymerization mixture. For 1 hour the polymerization mixture was kept at the reflux temperature of 145° C. Upon conclusion of the polymerization reaction it was found that all of the monomer had been converted. There was obtained an 80% by weight solution of the acrylate copolymer in xylene. The acrylate copolymer prepared had an acid number below 0.1 and a number average molecular weight of 1100.

EXAMPLE 9

Example 8 was repeated in such a way that the 3-mercaptopropionic acid and the glycidyl ester were added in amounts of 12.7 grammes (0.12 moles) and 137 grammes, respectively, and instead of phosphonium chloride benzyltrimethyl ammonium methoxide was used in an amount of 0.8 grammes. Upon conclusion of the polymerization it was found that all of the monomer had been converted.

There was obtained an 80% by weight solution of the acrylate copolymer in xylene. The acrylate copolymer prepared had an acid number of 5.6 and a number average molecular weight of 1000.

EXAMPLE 10

Example 8 was repeated in such a way that the 3-mercaptopropionic acid and the xylene were added in amounts of 17.0 grammes (0.16 moles) and 63 grammes, respectively, and the phosphonium chloride and the glycidyl ester were added in amounts of 17.0 grammes (0.16 moles) and 63 grammes, respectively, and the phosphonium chloride and the glycidyl ester were added in amounts of 0.35 grammes and 163 grammes, respectively. Upon conclusion of the polymerization it was found that all of the monomer had been converted.

There was obtained an 80% by weight solution of the acrylate copolymer in xylene. The acrylate copolymer prepared had an acid number of 0.1 and a number average molecular weight of 900.

EXAMPLE 11

The same procedure was used as in Example 10, except that instead of 3-mercaptopropionic acid there was used 2-mercaptoacetic acid in a corresponding amount (14.7 grammes; 0.16 moles). Upon conclusion of the polymerization it was found that all of the monomer had been converted.

There was obtained an 80% by weight solution of the acrylate copolymer in xylene. The acrylate copolymer prepared had an acid number of 0.7 and a number average molecular weight of 900.

EXAMPLE 12

The procedure of Example 10 was repeated, but in such a way that instead of 3-mercaptopropionic acid there was used mercaptosuccinic acid in a corresponding amount (24.0 grammes; 0.16 moles), and the xylene was used in an amount of 74 grammes, and further the phosphonium chloride and the glycidyl ester were used in amounts of 0.40 grammes and 200 grammes, respectively. Upon conclusion of the polymerization reaction it was found that all of the monomer had been converted.

There was obtained an 80% by weight solution of the acrylate copolymer in xylene. The acrylate polymer prepared had an acid number of 0.2 and a number average molecular weight of 1200.

EXAMPLE 13

The same procedure was used as in Example 10, except that instead of 3-mercaptopropionic acid there was used 2-mercaptoethanol in a corresponding amount (12.5 grammes; 0.16 moles) and the xylene was added in an amount of 53 grammes, and the phosphonium chloride and the glycidyl ester were used in amounts of 0.3 grammes and 125 grammes, respectively. Upon conclusion of the polymerization it was found that all of the monomer had been converted.

There was obtained an 80% by weight solution of the acrylate copolymer in xylene. The acrylate copolymer prepared had an acid number of 0.1 and a number average molecular weight of 800.

EXAMPLE 14

The same procedure was employed as in Example 10, except that instead of 3-mercaptopropionic acid there was used 2-mercaptobenzoic acid in a corresponding amount (24.6 grammes; 0.16 moles) and the xylene was used in an amount of 65 grammes. Upon conclusion of the polymerization it was found that all of the monomer had been converted.

There was obtained an 80% weight solution of the acrylate copolymer in xylene. The acrylate copolymer prepared had an acid number of 0.1 and a number average molecular weight of 1000.

PREPARATION OF COATING COMPOSITIONS HAVING A HIGH SOLIDS CONTENT

EXAMPLE 15

The following components were homogeneously intermixed:

| | |
|---|---|
| acrylate copolymer according to Example 1 | 25 g |
| pigment dispersion | 36 g |
| hexamethoxymethyl melamine | 1 g |
| a mixture of 2 parts by weight of xylene and 1 part by weight of ethylglycol acetate | 17 g |
| 20% solution of p-toluene sulphonic acid in isopropanol | 1.2 g |

The coating composition obtained was applied to a steel panel treated with zinc phosphate (Bonder 120) and cured for 30 minutes at a temperature of 130° C. The properties of the baked coating are mentioned in the Tables 1 and 2.

EXAMPLE 16

The same procedure was used as in Example 15, with the exception that use was made of the acrylate polymer prepared according to Example 2 and not the one prepared according to Example 1, and the solvent mixture was employed in an amount of only 14 grammes. The properties of the baked coating are mentioned in the Tables 1 and 2.

EXAMPLE 17

The same procedure was used as in Example 15, with the exception that use was made of 23 grammes of the acrylate copolymer according to Example 3 instead of 25 grammes of the acrylate copolymer according to Example 1, and the hexamethoxymethyl melamine and the solvent mixture were used in amounts of 3 grammes and 10 grammes, respectively. The properties of the baked coating are mentioned in the Tables 1 and 2.

EXAMPLE 18

The same procedure was employed as in Example 17, with the exception that use was made of the acrylate copolymer according to Example 4 instead of the one according to Example 3. The properties of the baked coating are listed in the Tables 1 and 2.

EXAMPLE 19

The same procedure was used as in Example 15, with the exception that use was made of the acrylate copolymer according to Example 5 instead of the one according to Example 1. The properties of the baked coating are mentioned in Table 1.

EXAMPLE 20

The same preocedure was used as in Example 15, with the exception that use was made of the acrylate copolymer according to Example 6 instead of the one according to Example 1. The properties of the baked coating are mentioned in Table 1.

EXAMPLE 21

The same procedure was used as in Example 15, with the exception that use was made of the acrylate copolymer according to Example 7 instead of the one according to Example 1. The properties of the baked coating are listed in Table 1.

EXAMPLE 22

The following components were homogeneously intermixed: 80% by weight solution of the acrylate copolymer in

| | |
|---|---|
| xylene according to Example 8 | 29 g |
| pigment dispersion | 36 g |
| hexamethoxymethyl melamine | 3 g |
| a mixture of equal parts by weight of xylene and ethylglycol acetate | 12 g |
| 20% solution of p-toluene sulphonic acid in isopropanol | 1.2 g |

The resulting coating composition was applied to a steel panel treated with zinc phosphate (Bonder 120) and cured for 30 minutes at a temperature of 130° C. The properties of the baked coating are mentioned in Table 1.

EXAMPLE 23-28

The procedure of Example 22 was repeated in such a way that instead of the solution of the acrylate copolymer according to Example 8 there was employed the 80% by weight solution in xylene of the acrylate copolymer prepared in accordance with the procedures used in the respective Examples 9(23), 10(24), 11(25), 12(26), 13(27) and 14(28). The properties of the baked coatings are listed in Table 1.

Table 1

| | Mechanical properties | | | | |
|---|---|---|---|---|---|
| | Persoz hardness | Falling weight test (kg.cm) | | Gloss | |
| Example | (sec) | Coated Side | Back | 60° | 20° |
| 15 | 272 | 14 | <2 | 96 | 88 |
| 16 | 260 | 14 | <2 | 96 | 87 |
| 17 | 232 | 21 | <2 | 97 | 89 |
| 18 | 215 | 30 | 2 | 96 | 89 |
| 19 | 264 | 14 | <7 | 97 | 88 |
| 20 | 230 | 42 | 10 | 96 | 88 |
| 21 | 250 | 50 | 12 | 96 | 87 |
| 22 | 250 | 19 | <2 | 96 | 88 |
| 23 | 225 | 30 | 8 | 96 | 88 |
| 24 | 157 | 60 | 30 | 96 | 88 |
| 25 | 190 | 44 | 11 | 92 | 82 |
| 26 | 218 | 28 | 7 | 95 | 83 |
| 27 | 195 | 44 | 9 | 93 | 82 |
| 28 | 265 | 23 | <2 | 98 | 92 |

Table 2

| | Durability | | | | Gloss at 60° after 680 hours in Weather-o-meter |
|---|---|---|---|---|---|
| | Resistance to | Resistance to $SO_2$ (Kesternich) | | | |
| Ex. | xylene | Cracks[1] | Attack[1] | Blistering[1] | |
| 15 | 12 | 12 | 10 | 12 | 93 |
| 16 | 12 | 12 | 12 | 12 | 93 |
| 17 | 11 | 12 | 7 | 12 | 90 |
| 18 | 11 | 12 | 7 | 8 | 91 |

[1] a value of 12 is excellent; a value of 0 is poor.

What is claimed is:

1. A method for the preparation of an acrylate copolymer by polymerization of a monomer mixture consisting of 35-60 mole % of styrene and/or α-methyl styrene, 20-60 mole % of acrylic acid and/or methacrylic acid and 0-30 mole % of one or more other monovinyl compounds at a temperature of 60° to 200° C. in the presence of a radical initiator, after which the resulting reaction product is brought into reaction with a glycidyl ester of a carboxylic acid of the general formula

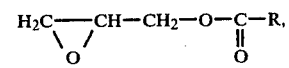

where R represents an alkyl group having 4 to 10 carbon atoms, characterized in that the polymerization of the monomeric compounds is carried out in the presence of a 2 to 8 carbon atoms-containing mercaptomonocarboxylic acid and/or mercaptodicarboxylic acid as chain length regulator in an amount of 0.02 to 0.25 moles per mole of the monomeric compounds.

2. The method of claim 1, characterized in that as chain length regulator there is used a mercaptomonocarboxylic acid and/or mercaptodicarboxylic acid containing 2-6 carbon atoms.

3. The method of claim 1, characterized in that as chain length regulator is used a mercaptopropionic acid.

4. The method of claim 1, characterized in that the chain length regulator is used in an amount of 0.05 to 0.20 moles per mole of the monomeric compounds.

5. A method for preparing an acrylate copolymer having a number average molecular weight from about 400 to about 2,000 and being useful in liquid coating compositions having a solids content of at least 60% by weight comprising polymerizing a monomer mixture consisting of (a) 35 to 60 mole % of styrene and/or α-methyl styrene, (b) 20 to 60 mole % of acrylic acid and/or methacrylic acid, and (c) 0 to 30 mole % of at least one other monovinyl compound,
at a temperature of 60° to 200° C.,
in the presence of a radical initiator, and in the presence of a 2 to 8 carbon atoms-containing mercaptomonocarboxylic acid and/or mercaptodicarboxylic acid as a chain length regulator in an amount of about 0.02 to about 0.25 moles per mole of the monomeric mixture, and
reacting the resulting reaction product with a glycidyl ester of a carboxylic acid of the formula

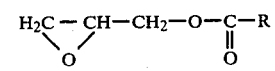

wherein R is an alkyl group having 4 to 10 carbon atoms.

* * * * *